US010855422B2

(12) United States Patent
Abedini et al.

(10) Patent No.: US 10,855,422 B2
(45) Date of Patent: Dec. 1, 2020

(54) AUTONOMOUS MODIFICATION OF TRANSMISSION PARAMETERS

(71) Applicant: QUALCOMM Incorporated, San Diego, CA (US)

(72) Inventors: Navid Abedini, Somerset, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/186,089

(22) Filed: Nov. 9, 2018

(65) Prior Publication Data

US 2019/0149289 A1 May 16, 2019

Related U.S. Application Data

(60) Provisional application No. 62/584,491, filed on Nov. 10, 2017.

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0003* (2013.01); *H04L 1/0009* (2013.01);
(Continued)

(58) Field of Classification Search
CPC ... H04L 1/0001; H04L 1/0002; H04L 1/0003; H04L 1/0009; H04L 1/0026;
(Continued)

(56) References Cited

U.S. PATENT DOCUMENTS 5,802,114 A * 9/1998 Koszarsky ........... H04B 17/318
375/340
6,487,394 B1 * 11/2002 Ue ........................ H04L 1/0002
370/465
(Continued)

FOREIGN PATENT DOCUMENTS

CN 102801457 A * 11/2012 ........... H04L 1/0009
CN 103858399 A * 6/2014 ........ H04W 52/0229
(Continued)

OTHER PUBLICATIONS

International Search Report and Written Opinion—PCT/US2018/060152—ISA/EPO —dated Mar. 29, 2019.
(Continued)

*Primary Examiner* — Eric Nowlin
(74) *Attorney, Agent, or Firm* — Qualcomm IP Dept.; James Hunt Yancey, Jr.

(57) ABSTRACT

A network node of a communication network may determine that a target transmission power for a subsequent transmission by the network node is no longer optimal. In response to the determination, the network node may autonomously modify one or more parameters of the subsequent transmission, from a modulation and coding scheme (MCS) and/or a set resources for the subsequent transmission. The network node may then transmit a channel, based at least in part on the one or more modified parameters, to a target network node in the subsequent transmission. The target network node may determine that the network node has autonomously modified the one or more parameters of the transmission, from the modulation and coding scheme (MCS) and/or the set resources for the transmission. The target network node may process the transmission based on the determination.

24 Claims, 15 Drawing Sheets

(51) Int. Cl.
*H04W 24/08* (2009.01)
*H04W 72/12* (2009.01)
*H04W 52/34* (2009.01)
*H04W 52/24* (2009.01)
*H04L 1/18* (2006.01)

(52) U.S. Cl.
CPC .......... *H04L 1/0015* (2013.01); *H04L 1/0017* (2013.01); *H04L 1/0034* (2013.01); *H04L 5/0051* (2013.01); *H04W 24/08* (2013.01); *H04W 72/12* (2013.01); *H04L 1/0025* (2013.01); *H04L 1/0027* (2013.01); *H04L 1/1812* (2013.01); *H04L 1/1896* (2013.01); *H04W 52/242* (2013.01); *H04W 52/346* (2013.01)

(58) Field of Classification Search
CPC ..... H04W 24/02; H04W 52/04; H04W 52/18; H04W 52/241; H04W 52/242; H04W 52/243; H04W 52/245; H04W 52/262; H04W 52/267; H04W 52/30; H04W 52/367
See application file for complete search history.

(56) References Cited

U.S. PATENT DOCUMENTS

| | | | | |
|---|---|---|---|---|
| 6,611,676 B2* | 8/2003 | Ue | .................. | H04L 1/0002 455/69 |
| 8,488,664 B2* | 7/2013 | Yokomakura | ......... | H04L 1/0003 370/252 |
| 8,644,408 B2* | 2/2014 | Gorokhov | ............. | H04L 5/0057 375/267 |
| 8,665,778 B2* | 3/2014 | Burgan | ............... | H04W 52/343 370/318 |
| 8,712,461 B2* | 4/2014 | Yavuz | ................... | H04W 52/40 455/522 |
| 8,983,397 B2* | 3/2015 | Gorokhov | ............... | H04L 1/0026 455/69 |
| 9,319,174 B2* | 4/2016 | Merlin | ................... | H04L 1/0023 |
| 9,467,269 B2* | 10/2016 | Davydov | ............... | H04L 1/0016 |
| 9,661,649 B2* | 5/2017 | Nanda | ................... | H04W 72/02 |
| 10,015,036 B2* | 7/2018 | Davydov | ............... | H04L 5/0046 |
| 10,623,081 B2* | 4/2020 | Levitsky | ............... | H04W 36/30 |
| 2005/0032541 A1* | 2/2005 | Wang | .................... | H04L 1/0002 455/522 |
| 2005/0213674 A1* | 9/2005 | Kobayashi | ............ | H04L 1/0003 375/259 |
| 2006/0063554 A1* | 3/2006 | Scharf-Katz | ........ | H04W 52/346 455/522 |
| 2007/0058758 A1* | 3/2007 | Ishii | ................... | H04L 27/2662 375/343 |
| 2008/0137577 A1* | 6/2008 | Habetha | ................ | H04W 52/24 370/311 |
| 2009/0047916 A1* | 2/2009 | Haykin | ............... | H04W 52/265 455/115.1 |
| 2010/0014500 A1* | 1/2010 | Lee | .................... | H04L 27/2647 370/342 |
| 2010/0054141 A1* | 3/2010 | Youn | ...................... | H04H 20/42 370/252 |
| 2010/0260251 A1* | 10/2010 | Yokomakura | ......... | H04L 1/0003 375/232 |
| 2011/0280261 A1* | 11/2011 | Varadarajan | ............ | H04L 27/20 370/475 |
| 2012/0263055 A1* | 10/2012 | Liu | .................... | H04W 52/0212 370/252 |
| 2013/0121193 A1* | 5/2013 | Tapia | ................ | H04W 28/0289 370/252 |
| 2013/0272210 A1* | 10/2013 | Merlin | .................. | H04L 1/0023 370/329 |
| 2014/0071838 A1* | 3/2014 | Jia | ............................ | H04B 7/04 370/252 |
| 2014/0112183 A1* | 4/2014 | Yang | ..................... | H04L 1/0025 370/252 |
| 2015/0215959 A1* | 7/2015 | Nanda | ................... | H04W 72/02 370/329 |
| 2015/0245326 A1 | 8/2015 | Rune et al. | | |
| 2016/0088639 A1* | 3/2016 | Schenk | ............... | H04W 72/085 370/329 |
| 2016/0142232 A1* | 5/2016 | Gao | ...................... | H04L 1/1614 370/329 |
| 2016/0353374 A1* | 12/2016 | Hoglund | ........... | H04W 52/0209 |
| 2019/0229788 A1* | 7/2019 | Zhang | ................... | H04L 1/0009 |
| 2019/0238209 A1* | 8/2019 | Levitsky | ............... | H04W 36/30 |
| 2019/0239135 A1* | 8/2019 | Levitsky | ........... | H04W 72/1226 |
| 2019/0305875 A1* | 10/2019 | Xue | ...................... | H04L 1/0003 |
| 2020/0076657 A1* | 3/2020 | Joseph | ................ | H04L 41/0886 |
| 2020/0136661 A1* | 4/2020 | Eliaz | ...................... | H03F 3/24 |

FOREIGN PATENT DOCUMENTS

| | | | | |
|---|---|---|---|---|
| CN | 104660367 A | * | 5/2015 | |
| CN | 103858399 B | * | 8/2017 | ........ H04W 52/0229 |
| EP | 2224629 A1 | * | 9/2010 | .............. H04L 1/20 |
| EP | 2684399 A2 | * | 1/2014 | .......... H04W 52/262 |
| EP | 2224629 A4 | * | 1/2015 | ....... H04L 25/03159 |
| EP | 2684399 A4 | * | 3/2015 | ........ H04W 52/0212 |
| EP | 2684399 B1 | * | 5/2018 | |
| JP | 4911780 B2 | * | 4/2012 | .......... H04L 1/0009 |
| WO | WO-2008111809 A2 | * | 9/2008 | ........... H04L 5/0058 |
| WO | WO-2008111809 A3 | * | 9/2009 | .............. H04B 1/16 |
| WO | WO-2012125511 A2 | * | 9/2012 | .......... H04L 1/0023 |
| WO | WO-2012159408 A1 | * | 11/2012 | .......... H04L 1/0003 |
| WO | WO-2012125511 A3 | * | 3/2014 | ........ H04W 52/0212 |
| WO | WO-2015103630 A1 | * | 7/2015 | ........... H04L 1/0009 |
| WO | WO-2019095246 A1 | * | 5/2019 | .......... H04W 74/0808 |
| WO | WO-2019136596 A1 | * | 7/2019 | .......... H04W 52/146 |

OTHER PUBLICATIONS

Research in Motion LTD: "Link Adaptation Overhead Reduction for VoIP", 3GPP Draft, R2-072775, 3RD Generation Partnership Project (3GPP), Mobile Competence Centre, 650, Route Des Lucioles, F-06921 Sophia-Antipolis Cedex, France, vol. RAN WG2, No. Orlando, USA, 20070622, Jun. 22, 2007 (Jun. 22, 2007), XP050135553, 4 Pages, [retrieved on Jun. 22, 2007].

* cited by examiner

AUTONOMOUS MODIFICATION OF TRANSMISSION PARAMETERS

CROSS-REFERENCE TO RELATED APPLICATIONS

The present application claims priority to and the benefit of U.S. Provisional Patent Application No. 62/584,491, filed Nov. 10, 2017 and entitled "AUTONOMOUS MODIFICATION OF TRANSMISSION PARAMETERS", the contents of which are incorporated herein by reference in its entirety as if fully set forth below and for all applicable purposes.

TECHNICAL FIELD

Aspects of the present disclosure relate generally to wireless communication systems, and more particularly, to autonomous modification of transmission parameters by scheduled network nodes. Embodiments can enable and provide intelligent communication nodes capable of self-adjusting transmission parameters given channel conditions. Embodiments may be used in a variety of contexts including relay backhaul or integrated access backhaul, multi-connectivity, and in instances where relay nodes may be scheduled by other nodes (e.g. relays or ANFs) with potentially conflicting schedules.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Networks can be multiple access networks supporting communications for multiple users by sharing available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects and features discussed in this application can be utilized to address several challenges. For example, a challenge may arise when a network node (e.g., a user equipment (UE)) is scheduled to transmit on a channel with a transmission power and modulation and coding scheme (MCS) within an allocated set of time/frequency resources, but the transmission power is no longer optimal. As another example, a challenge may arise when a network node may not be able to transmit over a channel with a given transmission power due to a need to reduce power to address a maximum permissible exposure (MPE) issue or to address self-interference (e.g., in full duplex operation). As yet another example, a network node may not be able to transmit over a channel with a given transmission power due to a need to split total power among multiple transmissions (e.g., as may occur in carrier aggregation (CA) or dual connectivity (DC) scenarios). And still yet another example may arise when a network node may not be able to transmit over a channel with a transmission power due to a change in estimated path loss (e.g., an increase in estimated path loss generally means that additional transmission power is needed to guarantee a same target receive power). As discussed below in more detail, embodiments of the present invention can help address these challenges by providing communication nodes autonomous communication intelligence to determine appropriate communication parameters in a wide variety of operational scenarios.

In one aspect, a method of operation for a network node of a communication network includes determining, by the network node, that a target transmission power for a subsequent transmission by the network node is no longer optimal. The method also includes autonomously modifying, by the network node and in response to the determining, one or more parameters of the subsequent transmission, from a modulation and coding scheme (MCS) and/or a set resources for the subsequent transmission.

In another aspect, a network node of a communication network has means for determining, by the network node, that a target transmission power for a subsequent transmission by the network node is no longer optimal. The network node also has means for autonomously modifying, by the network node and in response to the determining, one or more parameters of the subsequent transmission, from a modulation and coding scheme (MCS) and/or a set resources for the subsequent transmission.

In another aspect, a network node of a communication network has one or more processors and one or more memories coupled to the one or more processors. The one or more processors are configured to determine, by the network node, that a target transmission power for a subsequent transmission by the network node is no longer optimal. The one or more processors are also configured to autonomously modify, by the network node and in response to the determination, one or more parameters of the subsequent transmission, from a modulation and coding scheme (MCS) and/or a set resources for the subsequent transmission.

In another aspect, a non-transitory computer-readable medium has instructions recorded thereon that, when enacted by one or more computer processors, cause the one or more computer processors to determine, by a network node of a communication network, that a target transmission power for a subsequent transmission by the network node is no longer optimal. The instructions also cause the one or more computer processors to autonomously modify, by the network node and in response to the determining, one or more parameters of the subsequent transmission, from a modulation and coding scheme (MCS) and/or a set resources for the subsequent transmission.

In another aspect, a method of operation for a communication network includes determining, by the communication network, that a network node has autonomously modified one or more parameters of a transmission, including a modulation and coding scheme (MCS) and/or a set resources for the transmission. The method also includes processing the transmission, by the communication network, based on the determination.

In another aspect, a method of operation is disclosed for a user equipment configured to communicate with at least one other communication device. The method includes determining, by the user equipment, that a network node has autonomously modified at least one parameter of a transmission, from a modulation and coding scheme (MCS) and/or a set resources for the transmission. The method also includes processing the transmission, by the user equipment, based on the determination.

In another aspect, a first network node has means for determining that a second network node has autonomously modified one or more parameters of a transmission, including a modulation and coding scheme (MCS) and/or a set resources for the transmission. The first network node also has means for processing the transmission, by the first network node, based on the determination.

In another aspect, a first network node has one or more processors and one or more memories coupled to the one or more processors. The one or more processors are configured to determine, by the first network node, that a second network node has autonomously modified one or more parameters of a transmission, including a modulation and coding scheme (MCS) and/or a set resources for the transmission. The one or more processors are also configured to process the transmission, by the first network node, based on the determination.

In another aspect, in a first network node comprising a plurality of communication devices each configured to communicate with at least one other communication device, a user equipment device has at least one processor and at least one memory coupled to the at least one processor. The at least one processor is configured to determine, by the user equipment device, that a second network node has autonomously modified at least one parameter of a transmission, from at least one of a modulation and coding scheme (MCS) or a set resources for the transmission. The at least one processor is also configured to process the transmission, by the user equipment device, based on the determination.

In another aspect, a non-transitory computer-readable medium has instructions recorded thereon that, when enacted by one or more computer processors, cause the one or more computer processors to determine, by a first network node, that a second network node has autonomously modified one or more parameters of a transmission, including a modulation and coding scheme (MCS) and/or a set resources for the transmission. The instructions also cause the one or more processors to process the transmission, by the first network node, based on the determination.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure and discussed aspects/embodiments may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
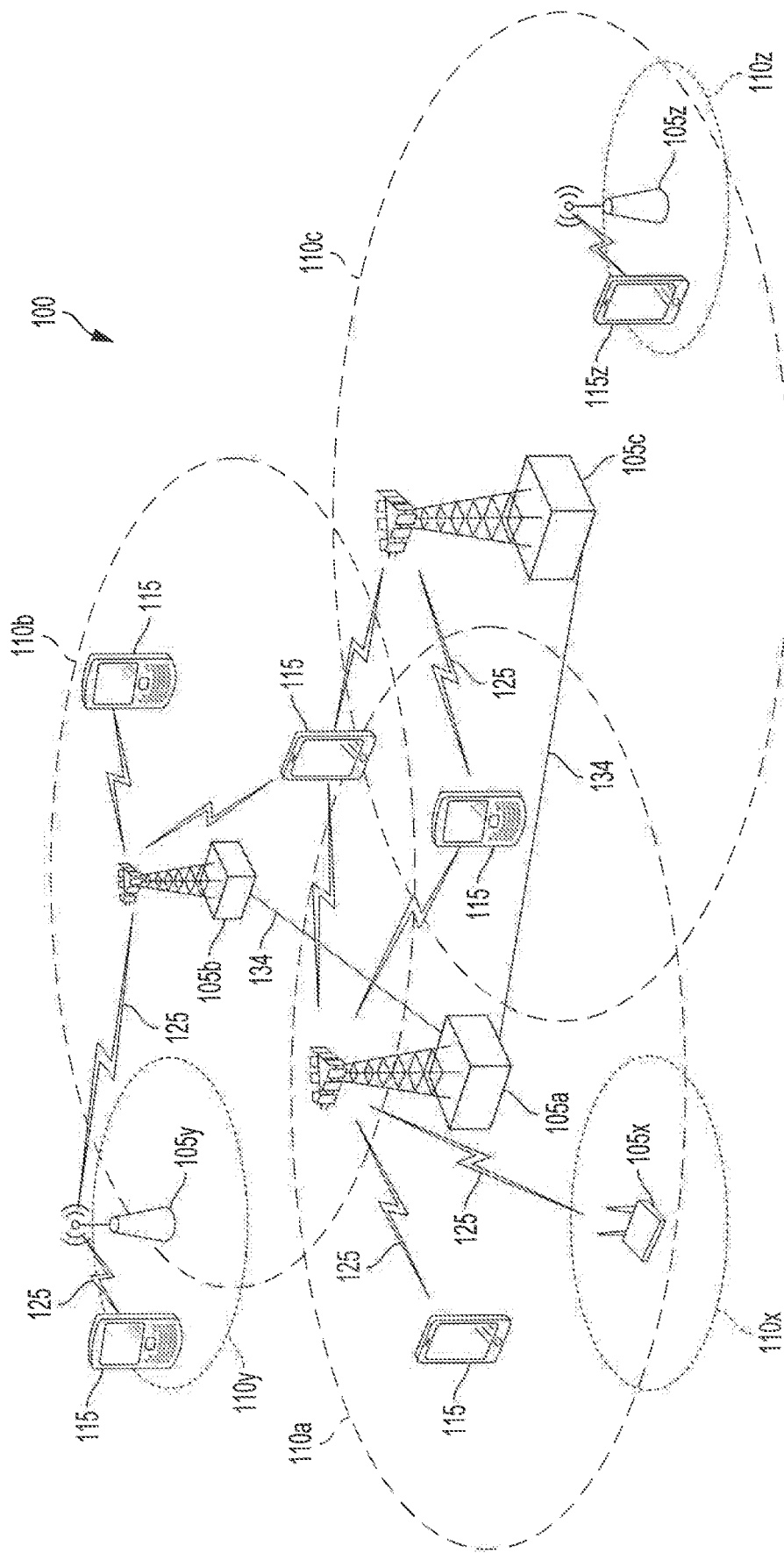
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, new radio (NR) networks, fifth generation (5G) networks, and other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces (including e.g., 5G or NR networks). Utilized radio technologies may also be include use of licensed and/or unlicensed spectrum according to various embodiments.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1, wireless network 100 includes a number of base stations. These may comprise evolved node Bs (eNBs) or next generation eNBs (gNBs). These may be referred to as gNBs 105. A gNB may be a station that communicates with the UEs and may also be referred to as a base station, a node B, an access point, and the like. Each gNB 105 may provide communication coverage for a particular geographic area. The term "cell" can refer to a particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Communications within network 100 may occur in various arrangements. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
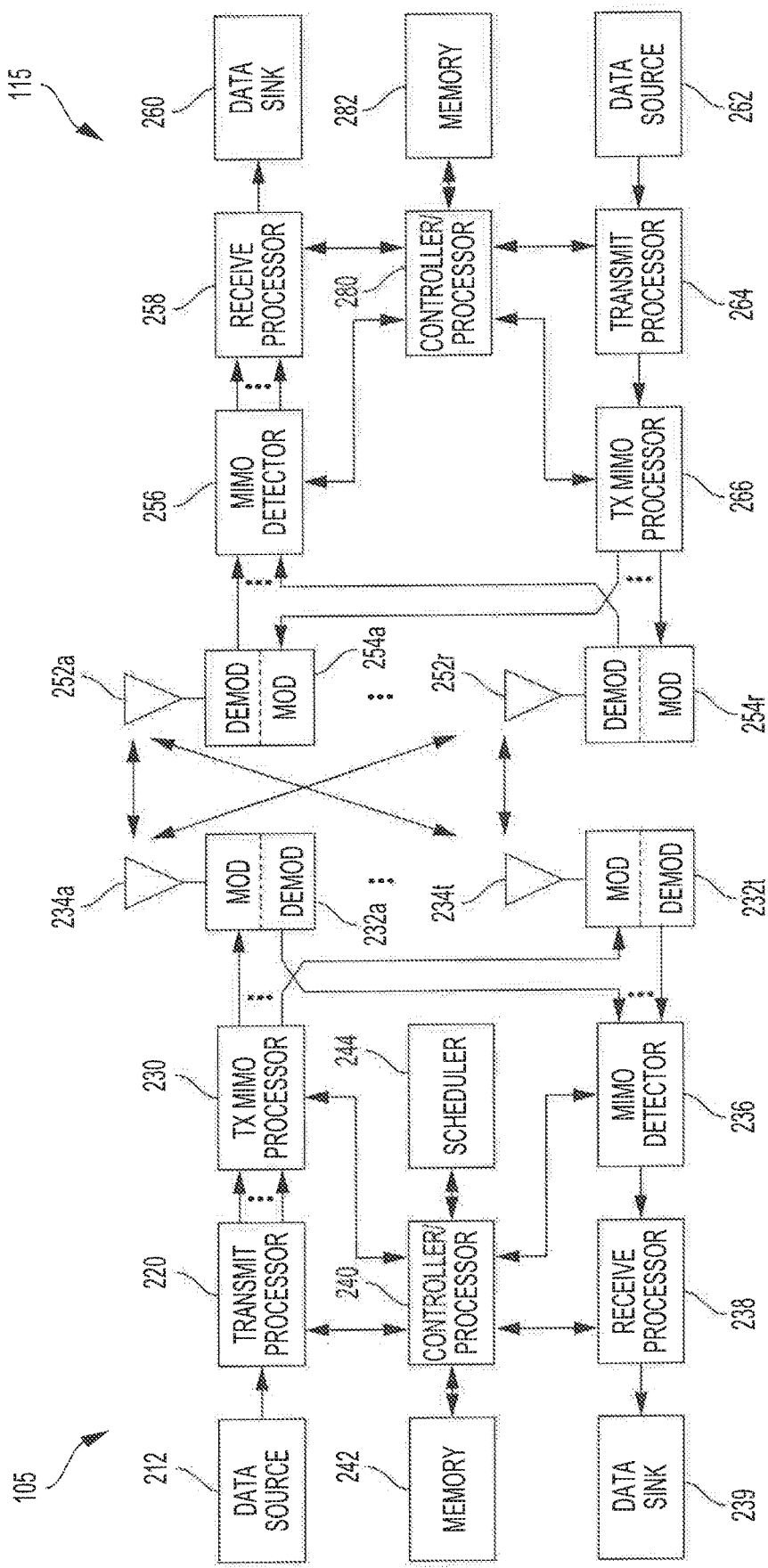
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z. To access small cell gNB 105z, the UE 115 can be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On an uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 4A-4F and 5A-5L, and/or other processes for the techniques described herein. Memories 242 and 282 may store data and program codes for gNB 105 and UE 115, respectively. Scheduler 244 may schedule UEs for data transmission on the downlink and/or uplink.

As mentioned above, embodiments disclosed herein can be utilized to address challenges seen in communication scenarios. In the scenarios described above, a network node may determine that a corresponding, reduced receive power, due to reduced transmit power or an unchanged transmit power but with increased path loss, will not be sufficient to support a given MCS. In such cases, a network node may transmit with a given MCS and a reduced power, but this transmission may fail. Alternatively, a network node may not transmit on a scheduled channel, such as when the reduced power is below a certain threshold compared to the scheduled power. In this case, a target node will not receive any communication. In either case of a failed transmission or a skipped transmission, these circumstances may serve as an indication to a scheduling node to modify a schedule for the next transmission. Still yet some scenarios suffer from failed or non-existent transmissions that waste allocated time/frequency resources.

Aspects and features discussed herein can help remedy such drawback scenarios. For example, in part, the present disclosure addresses challenges and scenarios mentioned above by allowing for a network node to modify transmission parameters in such a way as to utilize at least part of the allocated time/frequency resources. For example, a network node may transmit via a channel with a modified MCS (e.g., a lower or reduced MCS). Alternatively or additionally, a network node may transmit over a channel with reduced resources (e.g., such as a reduced subset of allocated resource blocks with more power per occupied resource element). Further aspects include that a network node may autonomously modify its transmission characteristics (e.g., increase MCS to leverage reduced path loss or other situations in which transmit power may be increased).

Figure 3A:
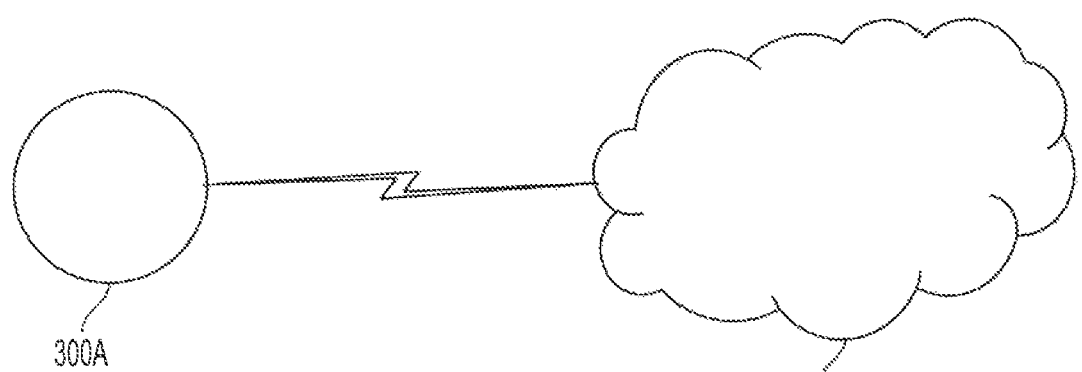
FIG. 3A is a block diagram illustrating a network node of a communication network according to the present disclosure.
Figure 3B:
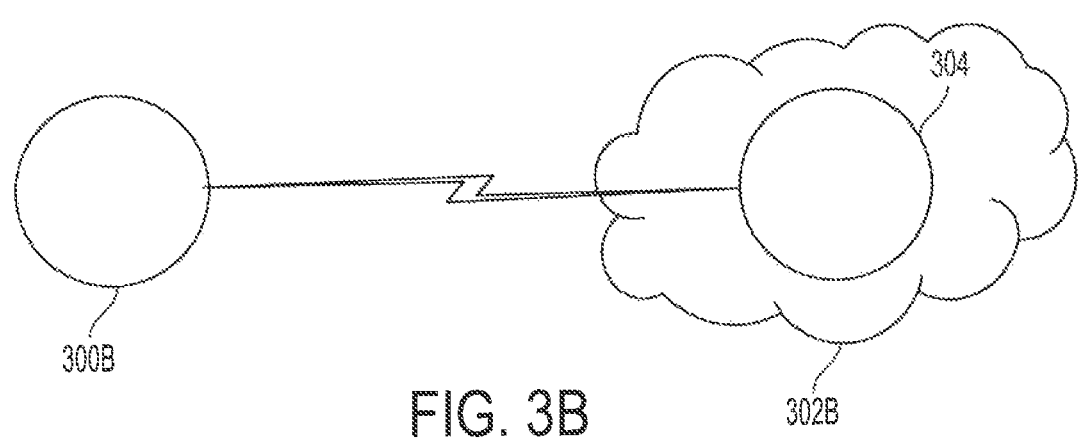
FIG. 3B is a block diagram illustrating a network node of a communication network according to the present disclosure.
Figure 3C:
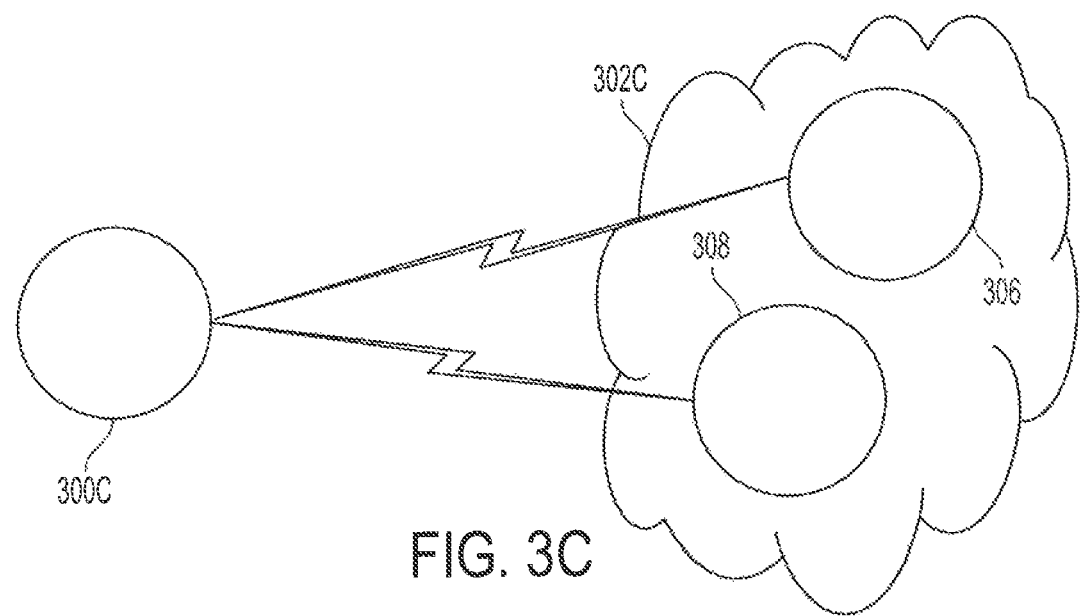
FIG. 3C is a block diagram illustrating a network node of a communication network according to the present disclosure.

Referring to FIG. 3A, the network node 300A of network 302A may be a UE in an access network or a UE-2-UE network, or relay node in a backhaul or integrated access and backhaul network. For example, referring to FIG. 3B, in network 302B, network node 300B may be a UE or relay node, scheduled by a base station, relay node, or UE 304, and transmitting an uplink channel, such as PUSCH, to the same base station, relay node, or UE 304. Alternatively, referring to FIG. 3C, the network 302C may be comprised of a scheduling node 306 and a target node 308, and the network node 300C may be scheduled by the scheduling node 306 to transmit to the target node 308 at the given transmit power and MCS within the allocated time/frequency resources.

Figure 4A:
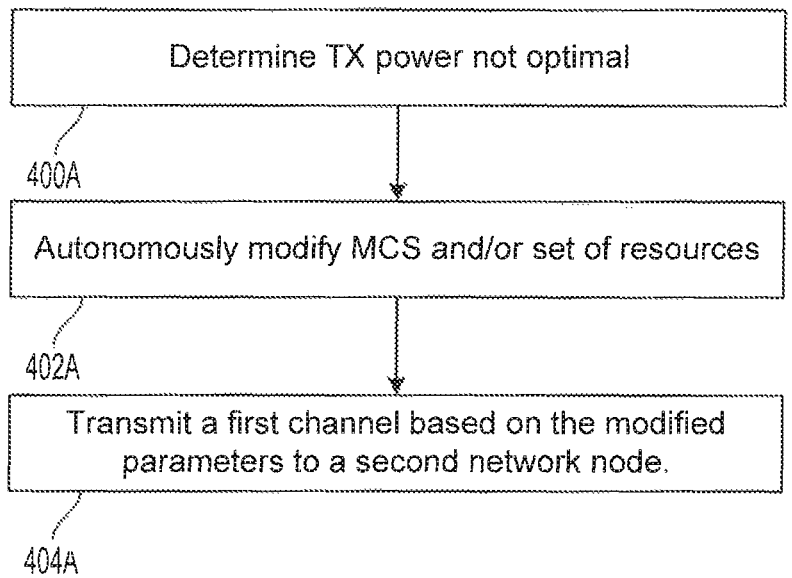
FIG. 4A is a block diagram illustrating example process blocks of a method of operation for a network node according to the present disclosure.

Turning now to FIG. 4A, for any of the above described scenarios, the network node may, at block 400A, determine that a transmission power targeted for a subsequent transmission (referred to as a "target transmission power") by the network node is no longer considered "optimal." In general, a transmission or transmission power is considered optimal when the node is able to transmit a given channel, with a given set of configurations (e.g., MCS), over a given set of resources, at a given transmit power, and not optimal when such a transmission cannot be made under the same set of parameters. The subsequent transmission may be a next transmission after the current transmission (e.g., an adjacent next transmission to the current transmission, a non-contiguous next transmission later in the transmission opportunity, or the like) of the network node or a transmission scheduled at a later time. In some examples, whether a target transmission power is optimal may be determined by a variety of factors associated with transmission power levels. These factors may include, for example, scenarios in which a network node may determine that a power back off should be triggered, that total power should be split among multiple transmissions, that an overall path loss has changed, and/or that a network node can support transmission with an enhanced configuration. Such factors may be dynamic in nature (or static) as may be desired or utilized for varying operational characteristics. Processing may proceed from block 400A to block 402A.

At block 402A, the network node may respond to the determination made at block 400A by autonomously modifying one or more parameters of the subsequent transmission, including MCS and/or a set resources for the subsequent transmission. For example, the network node may determine the modification of the MCS and/or the set of resources for the subsequent transmission based on the scheduled MCS, the target transmission power, a reduced transmission power, an estimated, reduced receive power, an amount of reduction in transmission power relative to the target transmission power, an amount of reduction in estimated receive power relative to an original, estimated receive power, the allocated resources, a type of signal or channel for the subsequent transmission, a state or identity of at least one of the network node or the other network node, a buffer status of the network node, one or more rules previously configured or previously indicated by the communication network, information related to hybrid automated repeat request (HARQ) configuration of the network node, and/or a type of scheduling of the subsequent transmission. Accordingly, the network node may autonomously modify (lower) its transmission configuration to make sure its transmission can be successfully received with high probability. Alternatively or additionally, there may be cases in which the network node realizes it can support transmission with enhanced configuration (e.g., supporting higher MCS). In such cases, the network node may be allowed to autonomously choose an improved configuration for its transmission.

At block 404A, the network node may transmit a first channel, based at least in part on the one or more modified parameters, to a target network node of the communication network in the subsequent transmission. Having determined the target transmission power is no longer optimal, the network node may transmit a first channel using the autonomously modified parameters.

In semi-persistent scheduling (SPS), the network node may be scheduled to transmit a number of channels/signals on a series of allocated resources within some time interval. SPS is unlike a dynamic scheduling where typically a node is granted a single set of resources for a single transmission. Therefore, SPS may comprise a sequence of transmissions (e.g., N transmissions). According to the present disclosure, the network node may determine to change its transmission configuration (either MCS or occupied resources or both) for the $n^{th}$ transmission (n=1, 2, . . . , N).

There may be some additional limitations for modifications performed in an SPS environment, and the network node may perform the autonomous modification for a particular instance of the subsequent transmission, in accordance with a predetermined rule limiting a number of autonomous modifications for a subsequent transmission, in accordance with a predetermined rule limiting an order of modifications it can autonomously perform, based on at least one of an original schedule or a previous modification, and/or in response to a message at least one of confirming a previous modification or providing a new schedule based on the previous modification. For example, the network node may have a limit on the number of modifications it can autonomously perform (e.g., only 1 modification). Additionally, the first node may have a limit on the order of transmissions it can modify (e.g., the modifications can be done only in a subset of N transmissions, or based on the latest modification, there might be a limit on the next modification (e.g., cannot perform two consecutive modifications)). Also, the determination of how to modify the transmission configuration (MCS/resources) may depend on the original schedule and/or any possible previous modifications. In such a case, the transmission configuration for the $n^{th}$ transmission may be determined based on the transmission configuration for the $(n-1)^{st}$ transmission, which may have been changed with respect to the original configuration. Further, the network node may need to receive a message (e.g., providing a new schedule, or confirming the modification) to continue its next transmissions after performing an autonomous modification, such as changing from SPS to dynamic scheduling, or the like.

The network node may also refrain from providing any indication, to another network node, of the autonomous modification of the one or more parameters. In such a case, the scheduling node and/or a target node may detect the autonomous modification and/or blindly attempt one or multiple hypotheses for MCS. The details of the actions performed by the scheduling node and/or target node are described in detail below with reference to FIG. 5A. However, even if no indication is provided of the modified MCS and/or resources, the network node may still notify the scheduling node and/or target node of a modified transmission power. This notification may assist the target node, for example, in measuring (and filtering) the power/quality (RSRP/RSRQ/RSSI) of the received signals from the network node, and to have a precise measurement/filtering it may need to know that the power of some transmissions is modified.

Figure 4B:
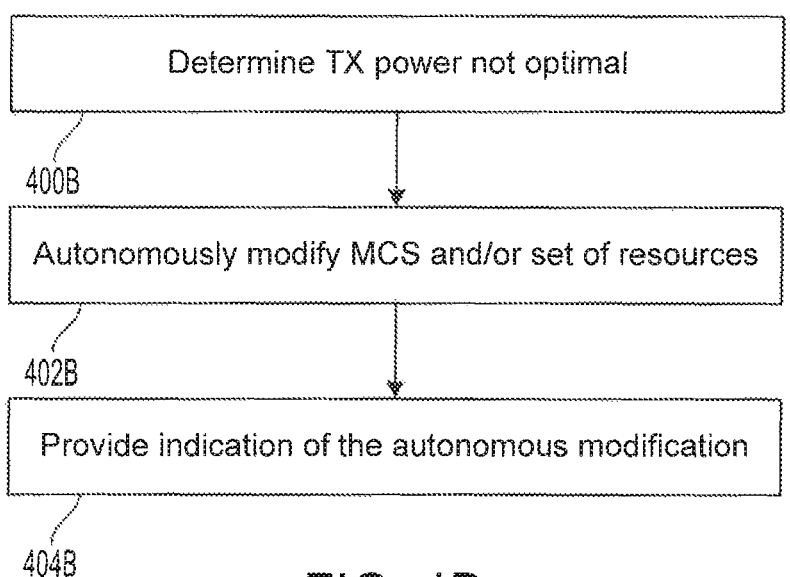
FIG. 4B is a block diagram illustrating example process blocks of a method of operation for a network node according to the present disclosure.

Referring to FIG. 4B, the network node may, at blocks 400B and 402B, determine that the target transmission power is not optimal and autonomously modify transmission parameters in a manner that is the same or similar to that described above with reference to blocks 400A and 400B of FIG. 4A. However, in FIG. 4B, processing may proceed from block 402B to block 404B, in which the network node may provide an indication, to a scheduling node and/or target node, of the autonomous modification. For example, the network node may provide an indication of the autonomous modification, to a scheduling node and/or target node, by selecting a characteristic of a demodulation reference signal (DMRS) that is predetermined to correspond to the autonomous modification. Alternatively, or additionally, the network node may provide an indication of the autonomous modification, to a scheduling node and/or target node, in a control part of the subsequent transmission. In either case, the indication may be an indication that an autonomous modification has been made, or it may be an indication of a type, value, and/or amount of the modification. The modification may pertain to either or both of the MCS and/or transmission resources, and modifications to other transmission configuration parameters, such as transmit power, may also be indicated.

The network node may select the characteristic of a DMRS that is predetermined to correspond to the autonomous modification in various ways. For example, the network node may select an initial value of the DMRS, a cyclic shift of the DMRS, a scrambling sequence of the DMRS, and/or set of resources for transmission of the DMRS. In the case of modification of the transmission resources by transmitting only on a subset of the allocated resources, the network node may transmit the DMRS on the same subset or within the whole set of allocated transmission resources.

The network node may transmit a control part of the subsequent transmission in various ways. For example, the control part may have a fixed MCS. The fixed MCS may have a value that requires a decoding SNR that is less than a threshold, for example, 0 dB. Also, the control part may be transmitted, by the network node, in response to the autonomous modification. Alternatively, the control part may be transmitted, by the network node, according to an assigned schedule. Further, the two parts of the subsequent transmission may be multiplexed in any combination of time domain (TDM), frequency domain (FDM), or code domain (CDM). A part of information (e.g., whether the MCS is modified) may be explicitly indicated, and additional information (e.g., value of the modified MCS or identification of resource blocks and/or resource elements) may be acquired by the target node. Alternatively or additionally, the network node may transmit the control part only if there is a change in MCS and/or resources. In this case, some information (e.g., 1 bit) can be indicated through DMRS to indicate whether the control part is transmitted, and the control segment may or may not be transmitted according to the originally allocated resources.

Figure 4C:
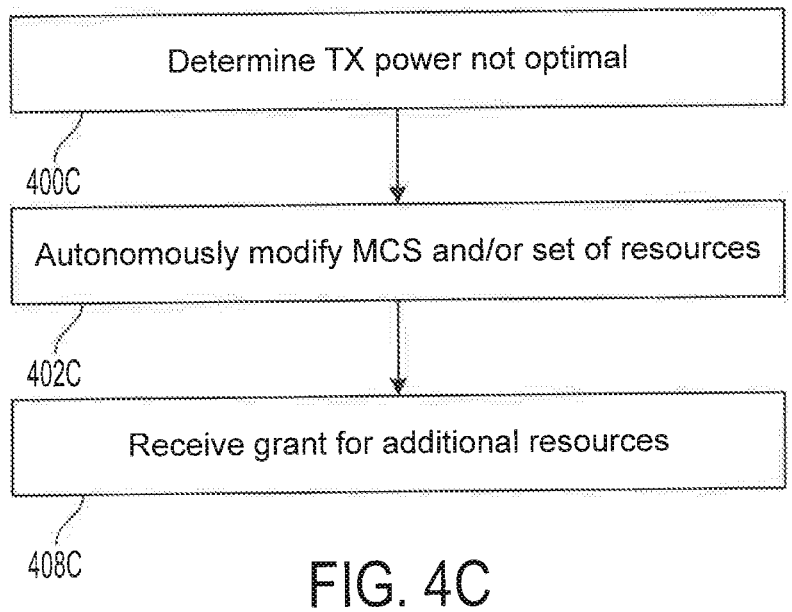
FIG. 4C is a block diagram illustrating example process blocks of a method of operation for a network node according to the present disclosure.

Turning now to FIG. 4C, the network node may, at blocks 400C and 402C, determine that the target transmission power is not optimal and autonomously modify transmission parameters in a manner that is the same or similar to that described above with reference to blocks 400A and 402A of FIG. 4A. However, in FIG. 4C, processing may proceed from block 402C to block 408C, at which the network node may receive a grant for additional resources. For example, the scheduling node and/or targeting node may detect the autonomous modification and determine that the network node needs additional resources. In response to that determination, a message may be transmitted to the network node that provides a new grant specifying new resources and potentially with modified MCS and/or transmit power so that the network node may complete its transmission. In this manner, the network node may receive such a grant for additional resources without explicitly indicating, to the scheduling node and/or target node, either a notification of the autonomous modification or a need for additional resources.

Figure 4D:
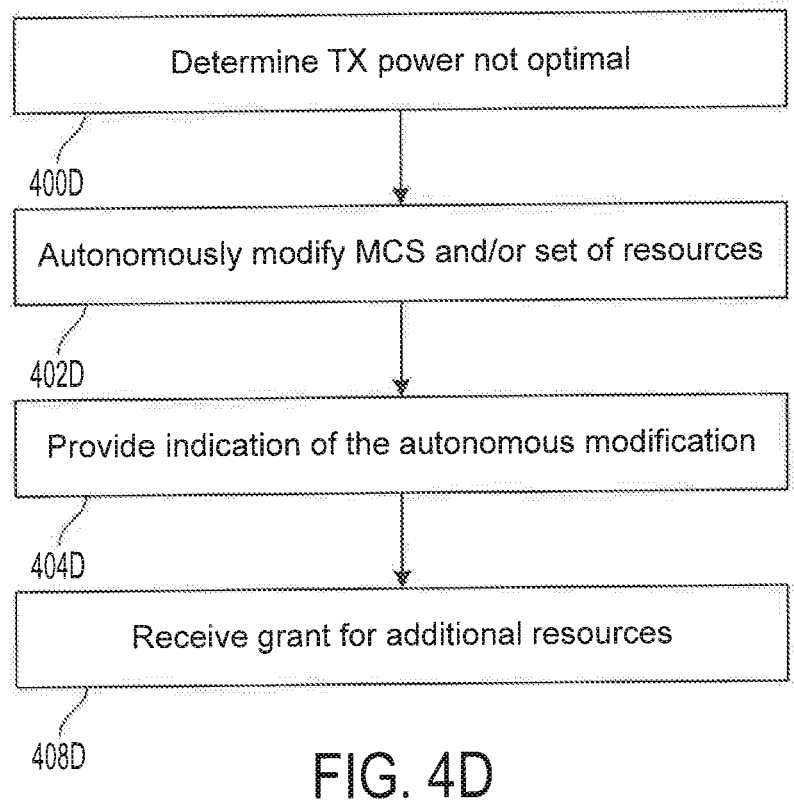
FIG. 4D is a block diagram illustrating example process blocks of a method of operation for a network node according to the present disclosure.

Referring to FIG. 4D, the network node may, at blocks 400D, 402D, and 404D, determine that the target transmission power is not optimal, autonomously modify transmission parameters, and provide a notification of the autonomous modification in a manner that is the same or similar to that described above with reference to blocks 400B, 402B, and 404B, of FIG. 4B. However, in FIG. 4D, processing may proceed from block 404D to block 408D, in which the network node receives a grant for additional resources in a same or similar manner as described above with respect to block 408C of FIG. 4C. In this manner, the network node may, at block 408D, receive a grant for additional resources that is transmitted in response to the notification provided at block 404D.

Figure 4E:
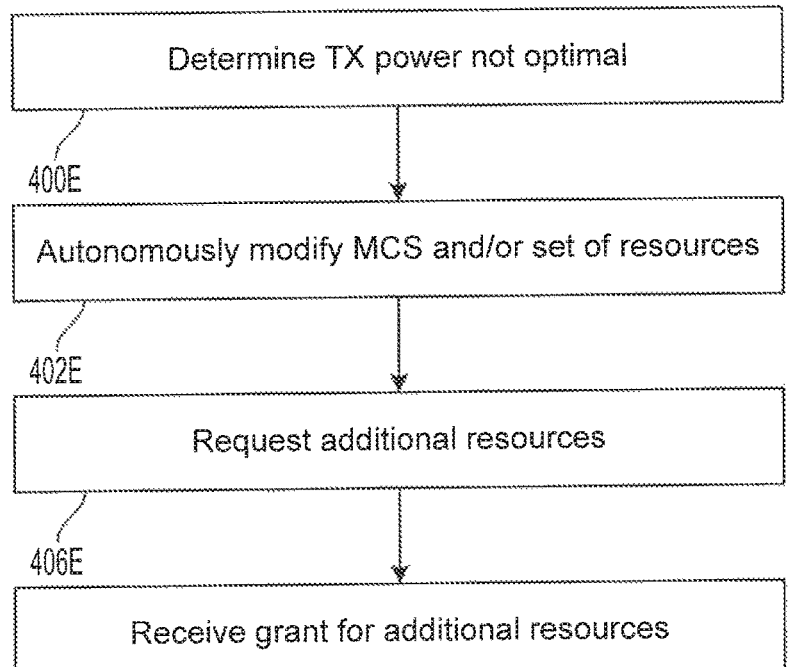
FIG. 4E is a block diagram illustrating example process blocks of a method of operation for a network node according to the present disclosure.

Referring to FIG. 4E, the network node may, at blocks 400E, 402E, and 408E, determine that the target transmission power is not optimal, autonomously modify transmission parameters, and receive a grant for additional resources in a manner that is the same or similar to that described above with reference to blocks 400A, 402A, and 408C, of FIGS. 4A and 4C. However, in FIG. 4E, processing may proceed from block 402E to block 406E, in which the network node requests additional resources from the scheduling node and/or target node. In this manner, the network node may, at block 408E, receive a grant for additional resources that is transmitted in response to the request made at block 406E.

Figure 4F:
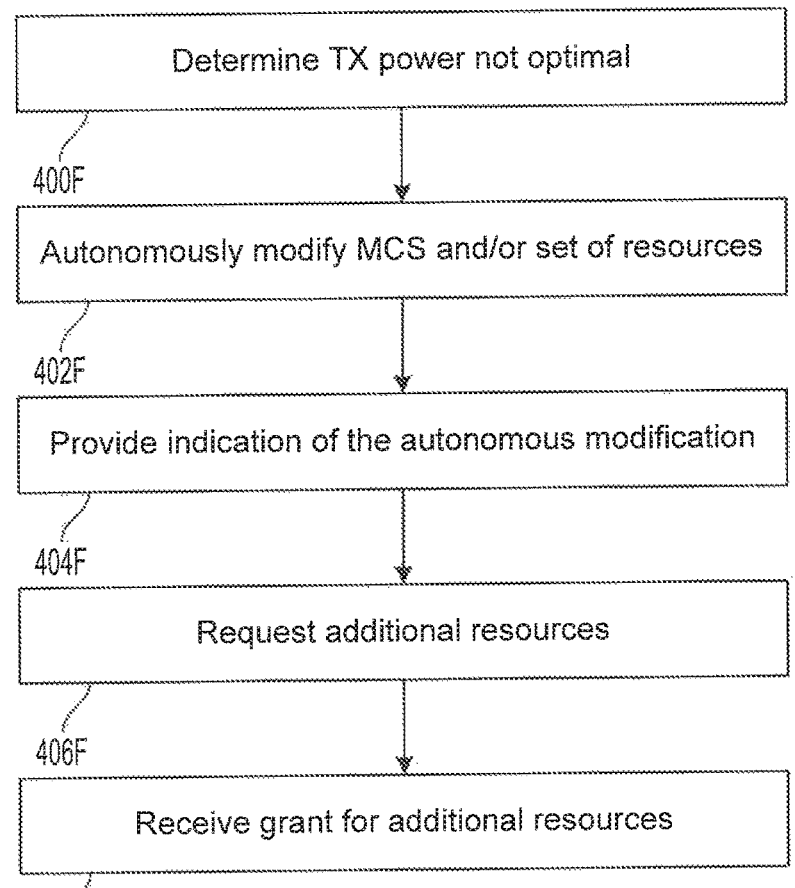
FIG. 4F is a block diagram illustrating example process blocks of a method of operation for a network node according to the present disclosure.

Referring to FIG. 4F, the network node may, at blocks 400F, 402F, 404F, 406F, and 408F, determine that the target transmission power is not optimal, autonomously modify transmission parameters, provide an indication of the autonomous modification, request additional resources, and receive a grant for additional resources in a manner that is the same or similar to that described above with reference to blocks 400A, 402A, 404B, 406E, and 408C of FIGS. 4A, 4B, 4C, and 4E. In this manner, the grant for additional resources may be transmitted in response to the notification provided at block 404F and/or the request made at block 406F.

Figure 5A:
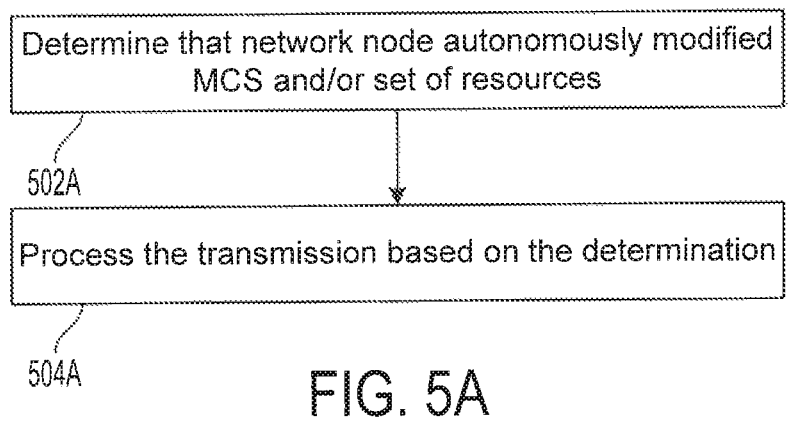
FIG. 5A is a block diagram illustrating example process blocks of a method of operation for a communication network according to the present disclosure.

Turning now to FIG. 5A, a method of operation for a network node begins at block 502A, in which the network node determines that another network node has autonomously modified one or more parameters of a transmission, including MCS and/or a set resources for the transmission. For example, the network node may measure receive power and/or receive quality (e.g., RSRP/RSRQ/RSSI) of the transmission, and determine that the other network node has autonomously modified the one or more parameters of the transmission based on the measurement. Alternatively or additionally, the network node may attempt to process the transmission and determine that the other network node has autonomously modified the at least one parameter of the transmission based on failure of the attempt to process the transmission. In either case, it is possible that the network node does not receive any notification from the other network node that an autonomous modification to MCS or transmission resources has been made. However, the network node may still receive a notification from the other network node, that the other network node has modified the transmit power of the transmission. Such a notification may assist the communication network with its measurements. Processing may proceed from block 502A to block 504A.

At block 504A, a network node may process a transmission based on a determination made at block 502A. For example, the network node may blindly check one or multiple hypotheses for modified MCS. Alternatively, or additionally, with knowledge that, and perhaps knowledge of the degree to which, the other network node has modified the target transmission power for a subsequent transmission, the network node may estimate a modified MCS based on the measurement and prioritize hypotheses for blind decoding based on the estimate. To determine the modified MCS and/or transmission resources, the network node may use the same or similar information employed by the other network node in determining the autonomous modification, as described in detail above.

Figure 5B:
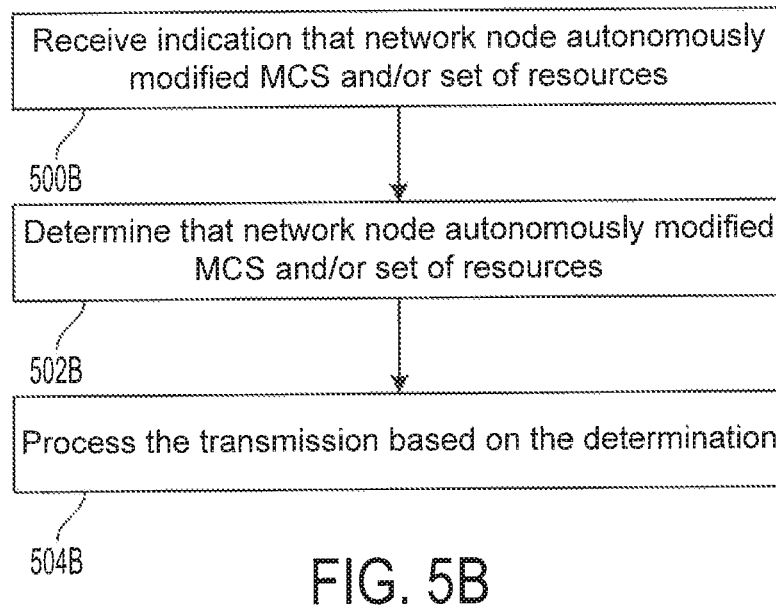
FIG. 5B is a block diagram illustrating example process blocks of a method of operation for a communication network according to the present disclosure.

Referring now to FIG. 5B, a network node may receive, at block 500, an indication, from another network node, of the autonomous modification. For example, the indication may be a characteristic of a DMRS transmitted by the other network node, as detailed above. Alternatively, or additionally, the indication may be contained in a control part of the transmission, as also detailed above. Accordingly, the indication may be an indication that an autonomous modification has been made, and/or an indication of a type, value, and/or amount of the modification. Also, the indicative characteristic of the DMRS may be an initial value of the DMRS, a cyclic shift of the DMRS, a scrambling sequence of the DMRS, and/or a set of resources for transmission of the DMRS. Further, the control part may have a fixed MCS, and the network node may detect and receive the control part using blind detection according to the fixed MCS, or it may detect and receive the control part according to a schedule of the control part assigned by the network node.

In some scenarios, a DMRS characteristic indicator and a control part indicator may be used and combined in various ways. For example, the DMRS sequence (or any related reference sequence) transmission may be limited to the reduced resources. In this case, the network node may use the received DMRS sequence to determine any modification in the occupied resources (e.g., by evaluating multiple hypotheses and calculating a correlation metric for each hypothesis. In another example, the DMRS sequence (or any related reference sequence) transmission may still be transmitted within the originally allocated resources. In this case, the DMRS sequence may carry some information about the possible modifications in the occupied resources. In yet another example, the control segment may or may not be transmitted according to the originally allocated resources. Processing may proceed from block 500B to blocks 502B and 504B, in which the communication network may determine that the other network node autonomously modified the transmission parameters, and process the transmission, as previously described.

Figure 5C:
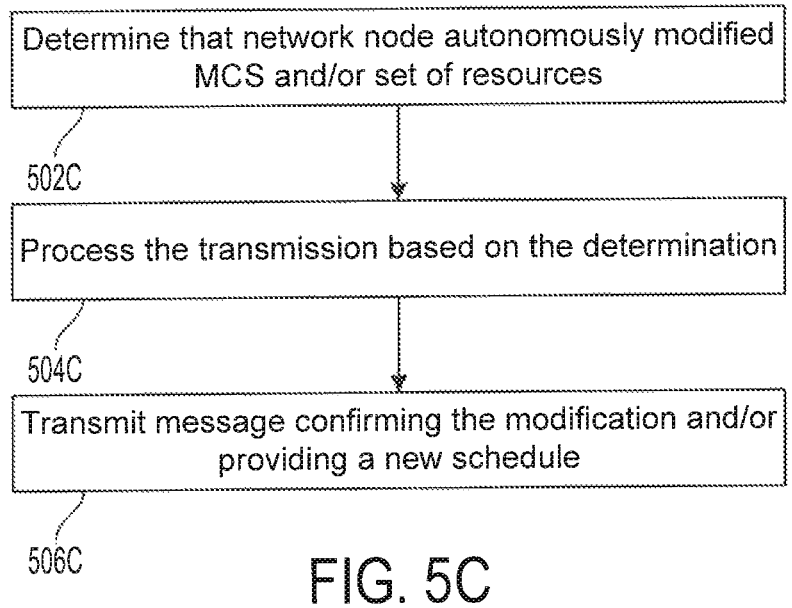
FIG. 5C is a block diagram illustrating example process blocks of a method of operation for a communication network according to the present disclosure.

Turning now to FIG. 5C, a network node may, at blocks 502C and 504C, determine that another network node autonomously modified transmission parameters and process a transmission in a same or similar manner as described above with respect to blocks 502A and 504A of FIG. 5A. However, in FIG. 5C, processing may proceed from block 504C to block 506C, in which the network node may transmit a message, to the other network node, at least one of confirming a previous modification or providing a new schedule based on the previous modification. The network node may carry out block 506C in the case that the transmission is scheduled by SPS.

Figure 5D:
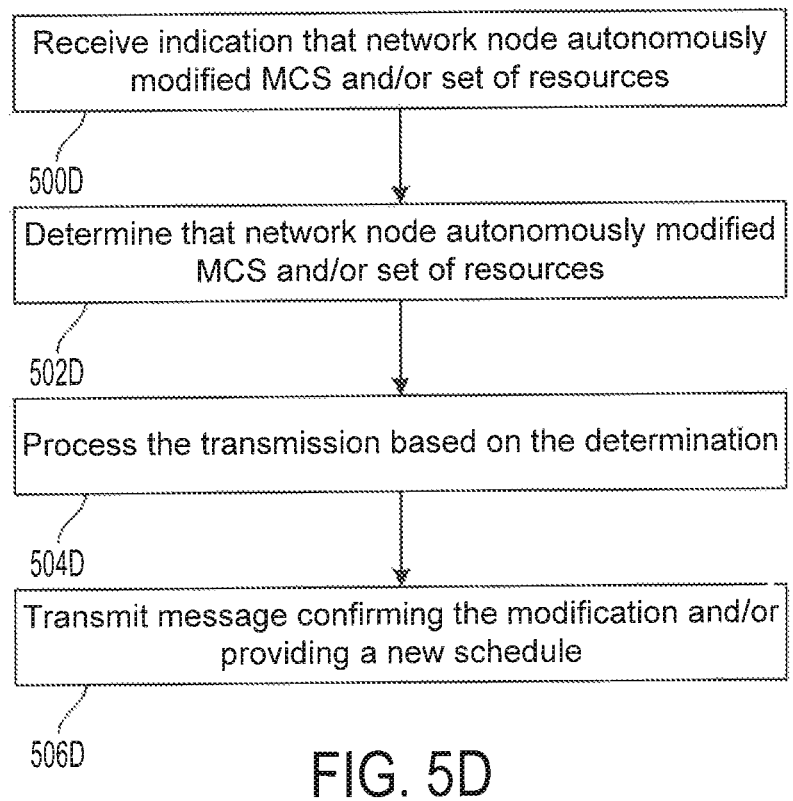
FIG. 5D is a block diagram illustrating example process blocks of a method of operation for a communication network according to the present disclosure.

Referring to FIG. 5D, a network node may, at blocks 500D, 502D, and 504D, receive an indication of autonomous modification, determine that an autonomous modification occurred, and process the transmission in a same or similar manner as described above with respect to blocks 500B, 502B, and 504B of FIG. 5B. However, in FIG. 5D, processing may proceed from block 504D to block 506D, in which the network node may transmit a message, to the other network node, at least one of confirming a previous modification or providing a new schedule based on the previous modification in a same or similar manner as described above with respect to block 506C.

Figure 5E:
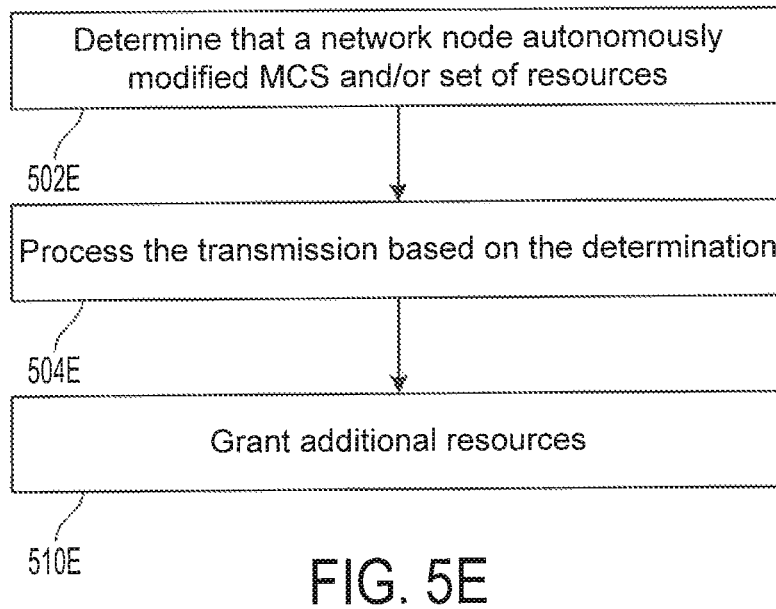
FIG. 5E is a block diagram illustrating example process blocks of a method of operation for a communication network according to the present disclosure.

Turning now to FIG. 5E, a network node may, at blocks 502E and 504E, determine that another network node autonomously modified the transmission parameters and process the transmission in a same or similar manner as described above with respect to blocks 502A and 504A of FIG. 5A. However, in FIG. 5E, processing may proceed from block 504E to block 510E, in which the network node may grant additional resources for the other network node to perform the remainder of the transmission. A grant may occur in response to the determination, at block 502E, that the other network node has autonomously modified one or more parameters of the transmission. In this way, a network node may transmit a message, to the other network node, that grants the additional resources without receiving a notification of the modification or a request for the additional resources.

Figure 5F:
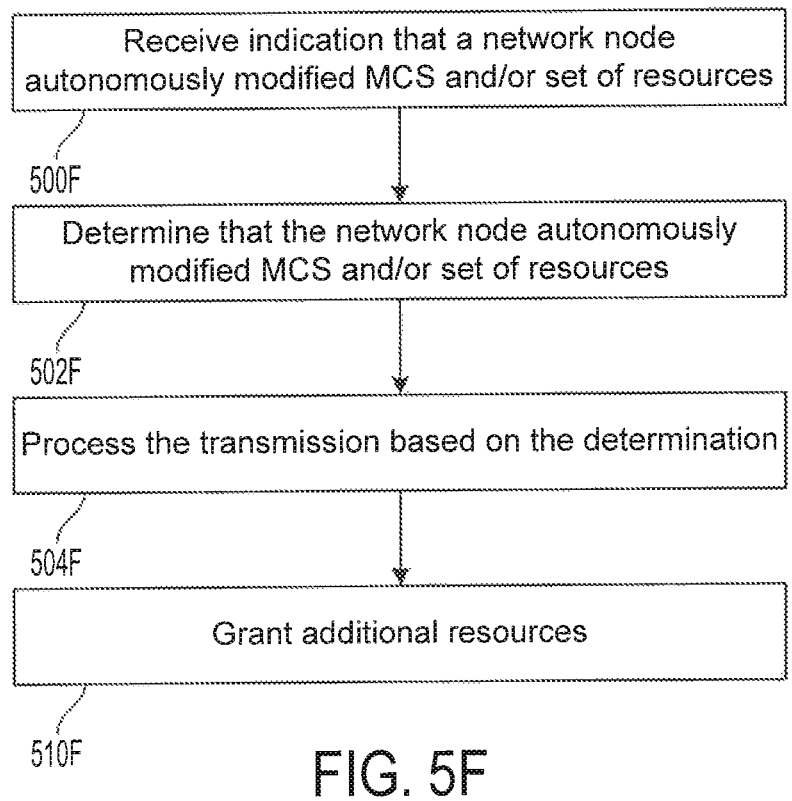
FIG. 5F is a block diagram illustrating example process blocks of a method of operation for a communication network according to the present disclosure.

Referring to FIG. 5F, a network node may, at blocks 500F, 502F, and 504F, receive an indication of an autonomous modification, determine that the autonomous modification occurred, and process the transmission in a same or similar manner as described above with respect to blocks 500B, 502B, and 504B of FIG. 5B. However, in FIG. 5F, processing may proceed from block 504F to block 510F, in which the network node may grant additional resources for the other network node to perform the remainder of the transmission in the same or similar manner as described above with respect to block 510E of FIG. 5E.

Figure 5G:
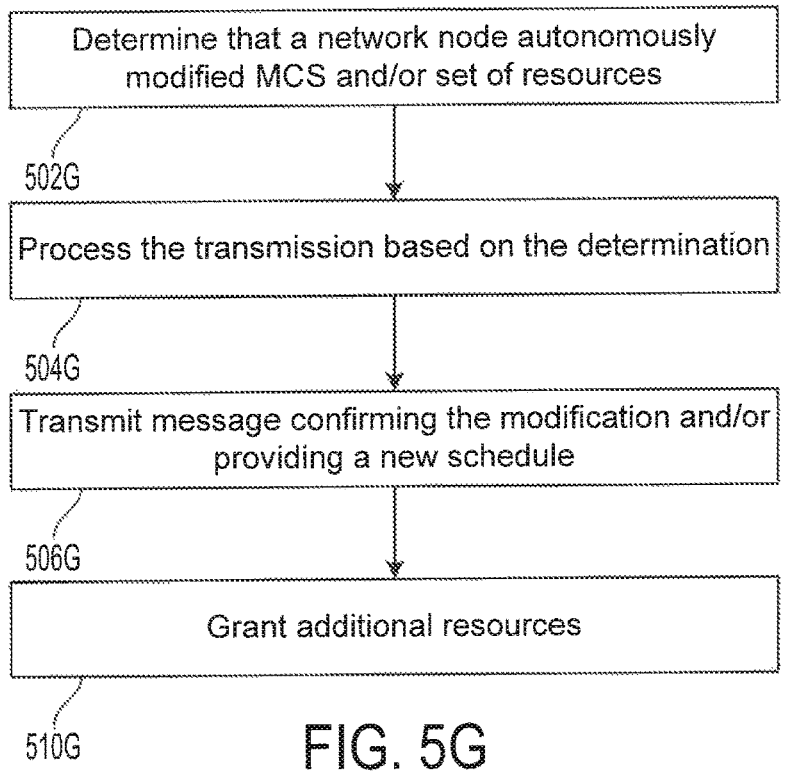
FIG. 5G is a block diagram illustrating example process blocks of a method of operation for a communication network according to the present disclosure.

Turning now to FIG. 5G, a network node may, at blocks 502G, 504G, and 506G, determine that the other network node autonomously modified the transmission parameters, process the transmission, and transmit a message confirming a previous modification or providing a new schedule in a same or similar manner as described above with respect to blocks 502A, 504A, and 506C of FIGS. 5A and 5C. However, in FIG. 5G, processing may proceed from block 506G to block 510G, in which the network node may grant additional resources for the other network node to perform the remainder of the transmission in the same or similar manner as described above with respect to block 510E of FIG. 5E.

Figure 5H:
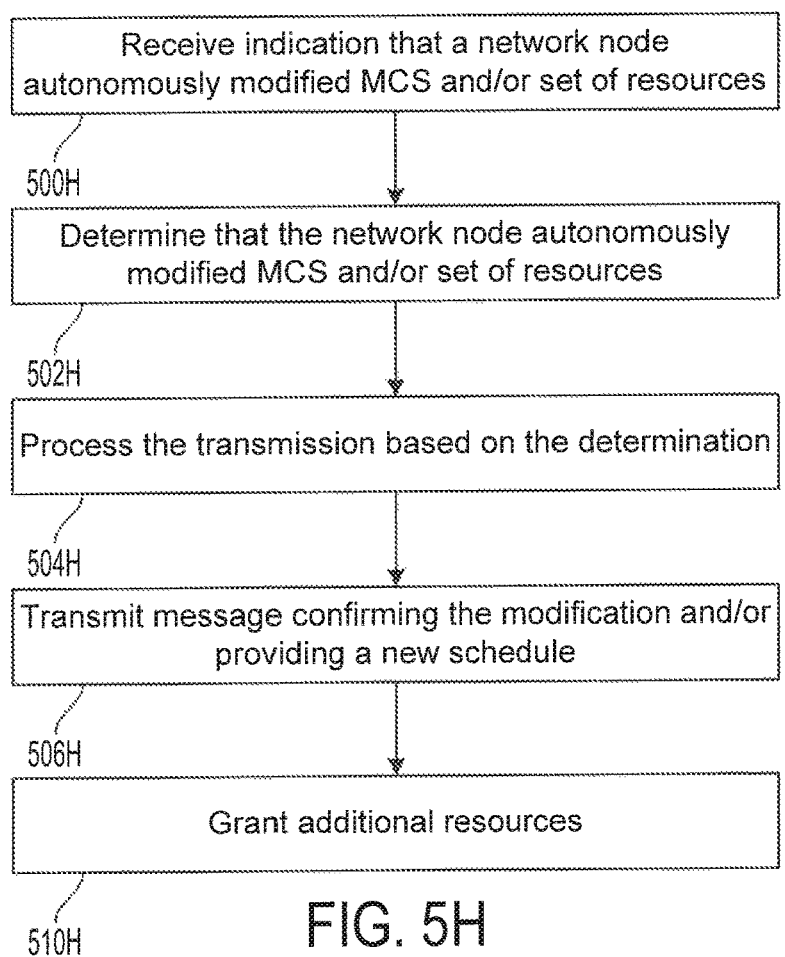
FIG. 5H is a block diagram illustrating example process blocks of a method of operation for a communication network according to the present disclosure.

Referring to FIG. 5H, a network node may, at blocks 500H, 502H, 504H, and 506H, receive an indication of the autonomous modification, determine that the autonomous modification occurred, process the transmission, and transmit a message confirming a previous modification or providing a new schedule in a same or similar manner as described above with respect to blocks 500B, 502B, 504B, and 506C of FIGS. 5B and 5C. However, in FIG. 5H, processing may proceed from block 506H to block 510H, in which the network node may grant additional resources for the other network node to perform the remainder of the transmission in the same or similar manner as described above with respect to block 510E of FIG. 5E.

Figure 5I:
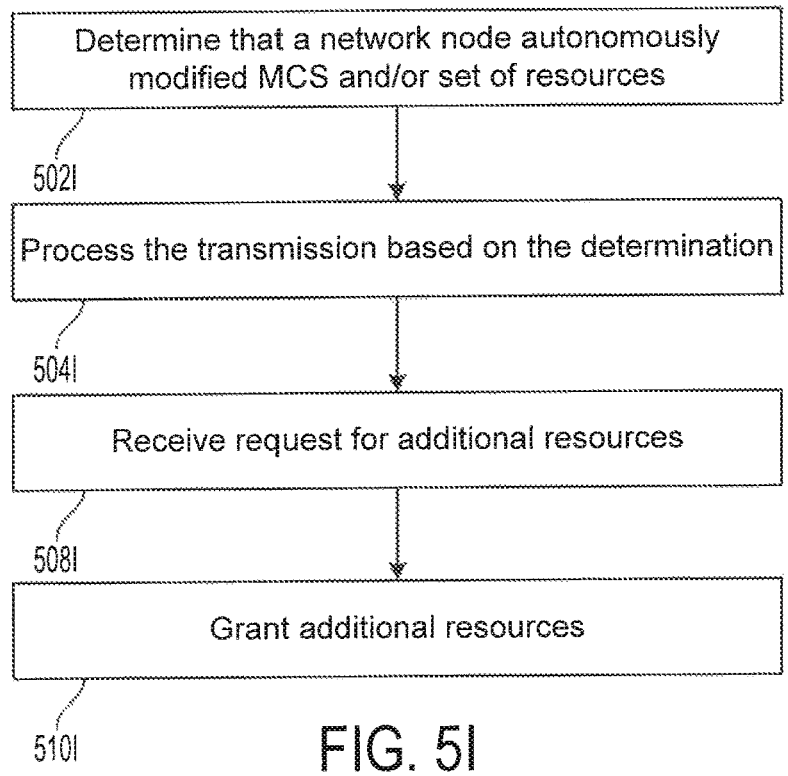
FIG. 5I is a block diagram illustrating example process blocks of a method of operation for a communication network according to the present disclosure.

Turning to FIG. 5I, a network node may, at blocks 502I and 504I, determine that the other network node autonomously modified the transmission parameters and process the transmission in a same or similar manner as described above with respect to blocks 502A and 504A of FIG. 5A. However, in FIG. 5I, processing may proceed from block 504I to block 508I, in which the network node may receive a request for additional resources from the other network node. Processing may then proceed from block 508I to block 510I, in which the network node may grant additional resources for the other network node to finish the transmission. In this manner, the grant of additional resources at block 5201 may occur in response to the receipt, at block 508I, of the request for the additional resources.

Figure 5J:
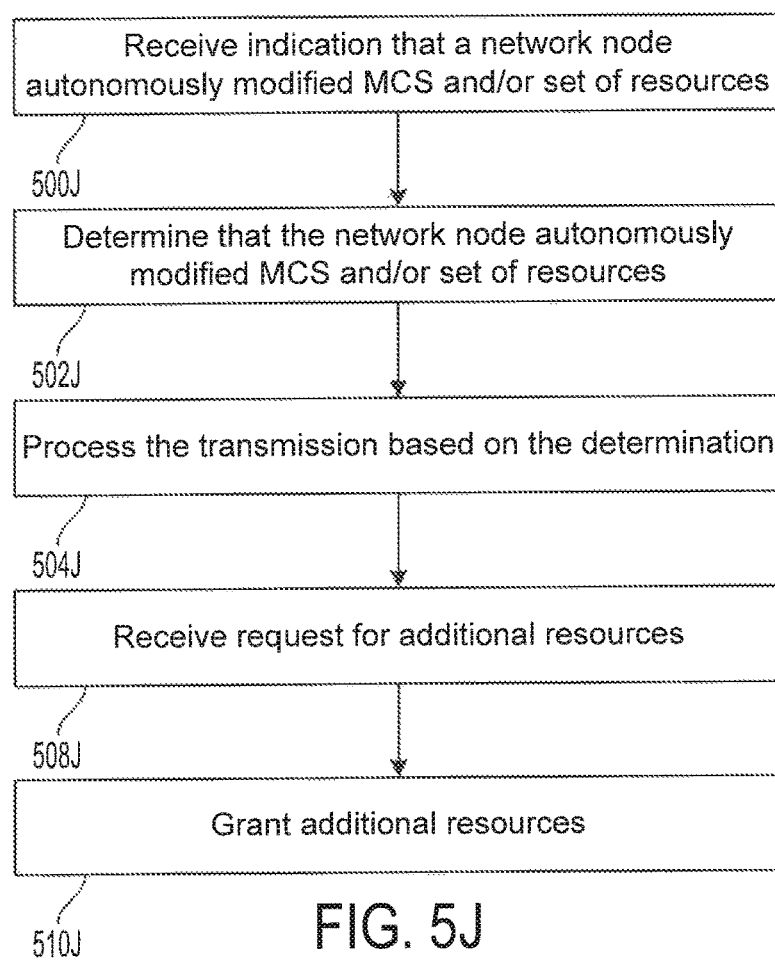
FIG. 5J is a block diagram illustrating example process blocks of a method of operation for a communication network according to the present disclosure.

Referring to FIG. 5J, a network node may, at blocks 500J, 502J, and 504J, receive an indication of the autonomous modification, determine that the autonomous modification occurred, and process the transmission in a same or similar manner as described above with respect to blocks 500B, 502B, and 504B of FIG. 5B. However, in FIG. 5J, processing may proceed from block 504J to blocks 508J and 510J, in which the network node may receive a request for additional resources and grant the additional resources in response to the request in the same or similar manner as described above with respect to blocks 508I and 510I of FIG. 5I. However, because the indication is received at block 500J, the request for additional resources may be received in the control segment of the transmission or indicated by a DMRS characteristic.

Figure 5K:
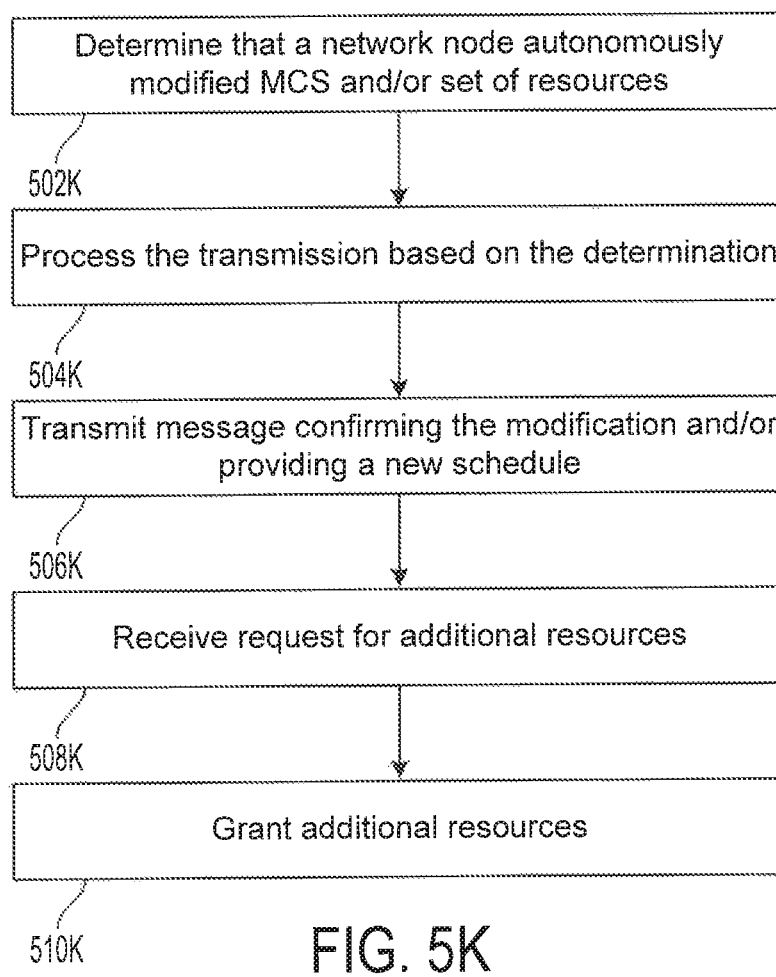
FIG. 5K is a block diagram illustrating example process blocks of a method of operation for a communication network according to the present disclosure.

Turning now to FIG. 5K, a network node may, at blocks 502K, 504K, and 506K, determine that the other network node autonomously modified the transmission parameters, process the transmission, and transmit a message confirming a previous modification or providing a new schedule in a same or similar manner as described above with respect to blocks 502A, 504A, and 506C of FIGS. 5A and 5C. However, in FIG. 5K, processing may proceed from block 506K to blocks 508K and 510K, in which the network node may receive a request for additional resources and grant the additional resources in response to the request in the same or similar manner as described above with respect to blocks 508I and 510I of FIG. 5I.

Figure 5L:
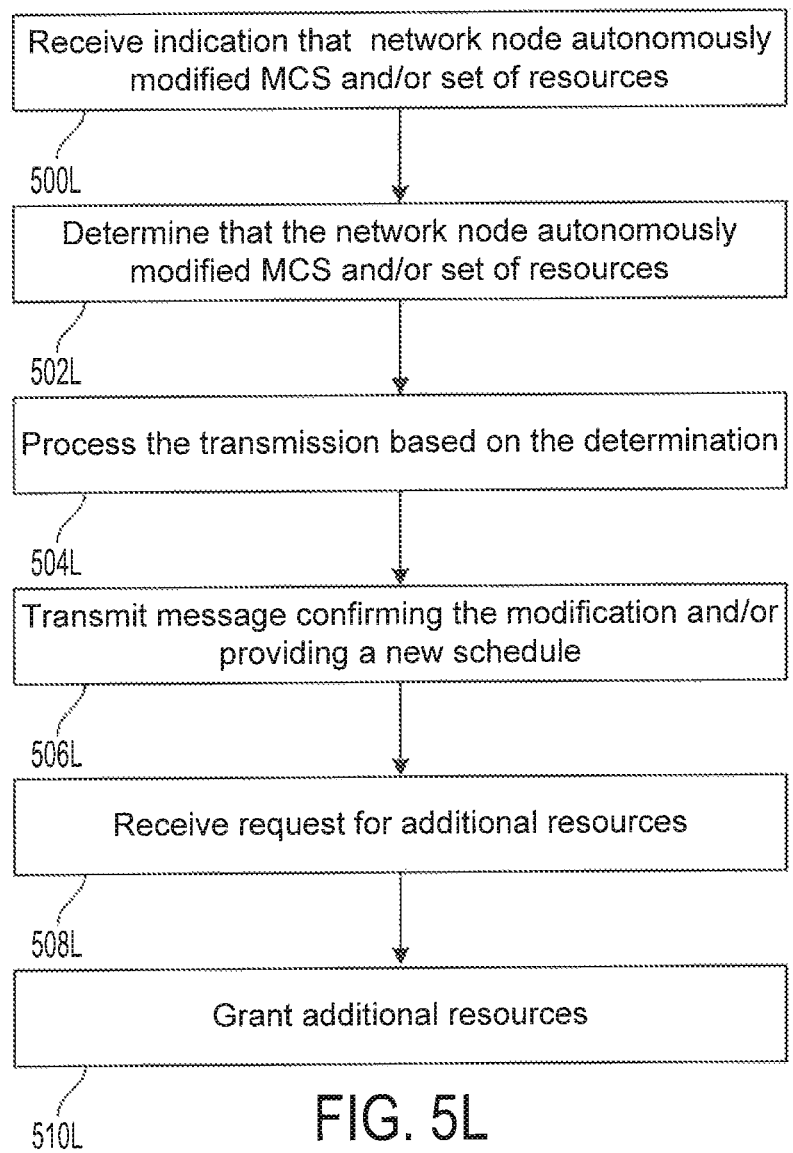
FIG. 5L is a block diagram illustrating example process blocks of a method of operation for a communication network according to the present disclosure.

Turning now to FIG. 5L, a network node may, at blocks 500L, 502L, 504L, and 506L, receive an indication of the autonomous modification, determine that the autonomous modification occurred, process the transmission, and transmit a message confirming a previous modification or providing a new schedule in a same or similar manner as described above with respect to blocks 500B, 502B, 504B, and 506C of FIGS. 5B and 5C. However, in FIG. 5L, processing may proceed from block 506L to blocks 508L and 510L, in which the network node may receive a request for additional resources and grant the additional resources in response to the request in the same or similar manner as described above with respect to blocks 508J and 510J of FIG. 5J.

Figure 6:
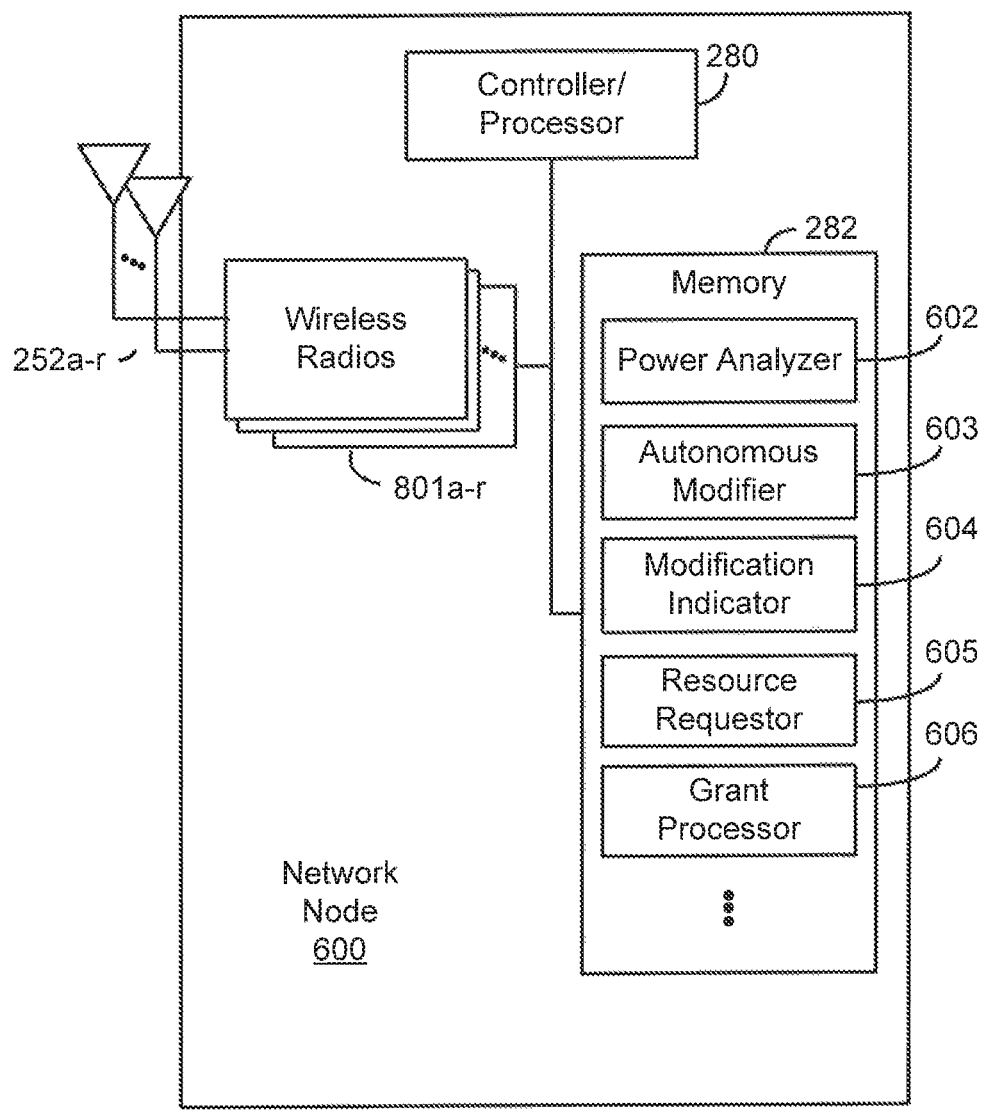
FIG. 6 is a block diagram illustrating a network node, such as a user equipment (UE), according to the present disclosure.

Turning to FIG. 6, a network node 600, such as a UE 105 (see FIG. 2), may have a controller/processor 280, a memory 282, and antennas 252a through 252r, as described above. Network node 600 may also have wireless radios 801a to 801r that comprise additional components also described above with reference to FIG. 2. The memory 282 of network node 600 stores algorithms that configure processor/controller 280 to carry out procedures as described above in FIGS. 4A-4F.

Algorithms stored by memory 282 configure processor/controller 280 to carry out procedures relating to autonomous modification of transmission parameters for a subsequent transmission, as previously described. For example, power analyzer 602 configures controller/processor 280 to carry out operations that include determining, in any manner previously described, that a target transmit power for a subsequent transmission is not optimal. Additionally, autonomous modifier 603 configures controller/processor 280 to carry out operations that include autonomously modifying transmission parameters, including MCS and/or transmission resources, in any manner previously described. Also, modification indicator 604 configures controller/processor 280 to carry out operations that include providing an indication of an autonomous modification in any manner previously described. Further, resource requestor 605 configures controller/processor 280 to carry out operations that include requesting additional resources in any manner previously described. Still further, grant processor 606 configures controller/processor 280 to carry out operations that include receiving and utilizing a grant for the additional resources in any manner previously described.

Figure 7:
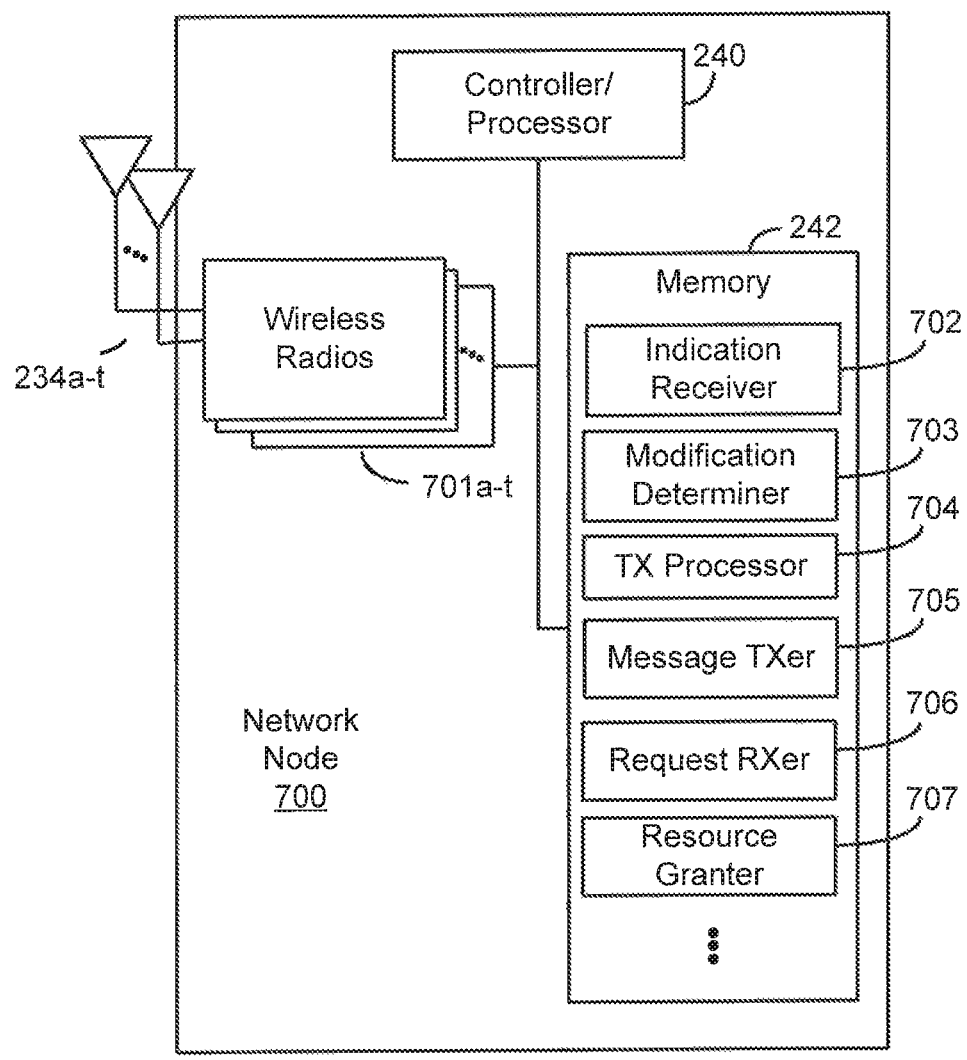
FIG. 7 is a block diagram illustrating a network node, such as a base station, according to the present disclosure.

Turning to FIG. 7, a network node 700, such as a NR-SS base station 105 (see FIG. 2), may have a controller/processor 240, a memory 242, and antennas 234a through 234t, as described above. The network node 700 may also have wireless radios 701a to 701t that comprise additional components also described above with reference to FIG. 2. The memory 242 of network node 700 stores algorithms that configure processor/controller 240 to carry out procedures as described above in FIGS. 5A-5L.

Algorithms stored by memory 242 configure processor/controller 240 to carry out operations relating to processing a transmission having autonomously modified transmission parameters as previously described. For example, indication receiver 702 configures controller/processor 240 to carry out operations that include receiving an indication of autonomous modification of transmit parameters n any manner previously described. Additionally, modification determiner 703 configures controller/processor 240 to carry out operations that include determining, in any manner previously described, that a network node has autonomously modified a parameter of a transmission, including MCs and/or a set resources for the transmission. Further, transmission processor 704 configures controller/processor 240 to carry out operations that include processing the transmission based on the determination in any manner previously described. Also, message transmitter 705 configures controller/processor 240 to carry out operations that include transmitting, in any manner previously described, a message confirming a modification or providing a new schedule. Further, request receiver 706 configures controller/processor 240 to carry out operations that include receiving a request for additional resources in any manner previously described. Still further, resource granter 707 configures controller/processor 240 to carry out operations that include granting additional resources to the network node in any manner previously described.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2, 4A-4F, 5A-5L, 6, and 7) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a first network node, that a target transmission power for a subsequent transmission by the first network node is no longer optimal;
   autonomously modifying, by the first network node in response to the determining that a target transmission power for a subsequent transmission by the first network node is no longer optimal, one or more parameters of the subsequent transmission from at least one of a modulation and coding scheme (MCS) or a set resources for the subsequent transmission;
   transmitting, by the first network node, a first channel, based at least in part on the autonomous modification of the one or more parameters, to a second network node in the subsequent transmission; and
   providing, by the first network node to another network node, at least one of:
      an indication of the autonomous modification by selecting a characteristic of a demodulation reference signal (DMRS) that is predetermined to correspond to the autonomous modification;
      an indication of the autonomous modification in a control part of the subsequent transmission; or
      no indication of the autonomous modification of the one or more parameters, wherein providing no indication comprises refraining from providing any indication of the autonomous modification of the one or more parameters.

2. The method of claim 1, wherein, the determination, by the first network node, that the target transmission power for the subsequent transmission by the first network node is no longer optimal is based, at least in part, on at least one of:
   a determination to trigger a power back off;
   a determination to split a total power among multiple transmissions;
   detection of a change in an overall path loss; or
   identification that the first network node can support transmission with an enhanced configuration.

3. The method of claim 1, wherein the indication is at least one of:
an indication that an autonomous modification has been made; or
an indication of at least one of a type, value, or amount of the modification.

4. The method of claim 1, further comprising selecting the characteristic of the DMRS by selecting at least one of:
an initial value of the DMRS;
a cyclic shift of the DMRS;
a scrambling sequence of the DMRS; or
a set of resources for transmission of the DMRS.

5. The method of claim 1, wherein the MCS is an MCS of a first part of the subsequent transmission, and wherein a second part of the subsequent transmission is a control part, has a second MCS that is fixed, and is at least one of:
transmitted, by the first network node, in response to the autonomous modification; or
transmitted, by the first network node, according to an assigned schedule.

6. The method of claim 1, comprising determining the autonomous modification, by the first network node, based at least in part on at least one of:
a scheduled MCS;
the target transmission power;
a reduced transmission power;
an estimated, reduced receive power;
an amount of reduction in transmission power relative to the target transmission power;
an amount of reduction in estimated receive power relative to an original, estimated receive power;
allocated resources;
a type of signal or channel for the subsequent transmission;
a state or identity of at least one of the first network node or the other network node;
buffer status of the first network node;
one or more rules previously configured or previously indicated by the communication network;
information related to hybrid automated repeat request (HARQ) configuration of the first network node; or
a type of scheduling of the subsequent transmission.

7. The method of claim 1, further comprising performing the autonomous modification based at least in part on at least one of:
for a particular instance of the subsequent transmission;
in accordance with a predetermined rule limiting a number of autonomous modifications for the subsequent transmission;
in accordance with a predetermined rule limiting an order of modifications it can autonomously perform;
based on at least one of an original schedule or a previous modification; or
in response to a message at least one of confirming a previous modification or providing a new schedule based on the previous modification.

8. The method of claim 1, wherein transmitting the first channel to the second network node comprises at least one of:
transmitting an uplink channel to a next generation node B (gNB) in an access network;
transmitting a channel, in at least one of a backhaul network or integrated access and backhaul network, to a relay node; or
transmitting a channel to at least one of a gNB or a UE.

9. A first network node configured for wireless communication, comprising:
at least one processor;
at least one memory coupled to the at least one processor, wherein the at least one processor is configured to:
determine that a target transmission power for a subsequent transmission by the first network node is no longer optimal;
autonomously modify one or more parameters of the subsequent transmission, from at least one of a modulation and coding scheme (MCS) or a set resources for the subsequent transmission;
transmit a first channel, based at least in part on the autonomous modification of the one or more parameters, to a second network node of the communication network; and
provide, by the first network node to another network node, at least one of:
an indication of the autonomous modification by selecting a characteristic of a demodulation reference signal (DMRS) that is predetermined to correspond to the autonomous modification;
an indication of the autonomous modification in a control part of the subsequent transmission; or
no indication of the autonomous modification of the one or more parameters, wherein providing no indication comprises refraining from providing any indication of the autonomous modification of the one or more parameters.

10. The network node of claim 9, wherein, the determination, by the first network node, that the target transmission power for the subsequent transmission by the first network node is no longer optimal is based, at least in part, on at least one of:
a determination to trigger a power back off;
a determination to split a total power among multiple transmissions;
detection of a change in an overall path loss; or
identification that the first network node can support transmission with an enhanced configuration.

11. The network node of claim 9, wherein the at least one processor is configured to determine the autonomous modification, by the first network node, based at least in part on at least one of:
a scheduled MCS;
the target transmission power;
a reduced transmission power;
an estimated, reduced receive power;
an amount of reduction in transmission power relative to the target transmission power;
an amount of reduction in estimated receive power relative to an original, estimated receive power;
allocated resources;
a type of signal or channel for the subsequent transmission;
a state or identity of at least one of the first network node or the other network node;
buffer status of the first network node;
one or more rules previously configured or previously indicated by the communication network;
information related to hybrid automated repeat request (HARQ) configuration of the first network node; or
a type of scheduling of the subsequent transmission.

12. A method of wireless communication, comprising:
measuring, by a first network node, at least one of receive power or receive quality of a transmission;

determining, by the first network node, that a second network node has autonomously modified at least one parameter of the transmission based on the measurement, from at least one of a modulation and coding scheme (MCS) or a set resources for the transmission; and processing the first network node's transmission based on the determination.

13. The method of claim 12, further comprising:
estimating a modified MCS based on the measurement; and
prioritizing hypotheses for blind decoding based on the estimate.

14. The method of claim 12, further comprising:
attempting, by the first network node, to process the transmission; and
determining, by the first network node, that the second network node has autonomously modified the at least one parameter of the transmission based on failure of the attempt to process the transmission.

15. The method of claim 12, further comprising:
receiving an indication, from the first network node, of the autonomous modification, wherein the indication is at least one of:
 a characteristic of a demodulation reference signal (DMRS) transmitted by the first network node, and the characteristic is predetermined to correspond to the autonomous modification; or
 contained in a control part of the transmission.

16. The method of claim 15, wherein the indication is at least one of:
an indication that an autonomous modification has been made; or
an indication of at least one of a type, value, or amount of the modification.

17. The method of claim 15, wherein the characteristic of the DMRS corresponds to at least one of:
an initial value of the DMRS;
a cyclic shift of the DMRS;
a scrambling sequence of the DMRS; or
a set of resources for transmission of the DMRS.

18. The method of claim 15, wherein the MCS is an MCS of a first part of the subsequent transmission, and wherein a second part of the subsequent transmission is a control part and has a second MCS that is fixed, the method further comprising detecting the control part, by the first network node, at least one of:
using blind detection according to the second MCS; or
according to a schedule of the control part assigned by the first network node.

19. The method of claim 12, wherein the transmission is scheduled by semi-persistent scheduling (SPS), and the method further comprises:
transmitting a message, by the first network node to the second network node, at least one of confirming a previous modification or providing a new schedule based on the previous modification.

20. The method of claim 12, further comprising:
granting additional resources, by the first network node, to the second network node, wherein the granting occurs in response to:
 the determination that the second network node has autonomously modified the at least one parameter of the transmission; or
 receipt of a request, from the second network node, for the additional resources.

21. A first network node configured for wireless communication, comprising:
at least one processor; and
at least one memory coupled to the at least one processor, wherein the at least one processor is configured to:
 measure, by the first network node, at least one of receive power or receive quality of a transmission;
 determine, by the first network node, that a second network node has autonomously modified at least one parameter of the transmission based on the measurement, from at least one of a modulation and coding scheme (MCS) or a set resources for the transmission; and
 process the second network node's transmission, by the first network node, based on the determining, by the first network node, that the second network node has autonomously modified the at least one parameter of the transmission.

22. The first network node of claim 21, wherein the at least one processor is configured to:
attempt, by the first network node, to process the transmission; and
determine, by the first network node, that the second network node has autonomously modified the at least one parameter of the transmission based on failure of the attempt to process the transmission.

23. The first network node of claim 21, wherein the at least one processor is configured to:
receive an indication, from the second network node, of the autonomous modification, wherein the indication is at least one of:
 a characteristic of a demodulation reference signal (DMRS) transmitted by the second network node, and the characteristic is predetermined to correspond to the autonomous modification; or
 contained in a control part of the transmission.

24. The first network node of claim 21, wherein the transmission is scheduled by semi-persistent scheduling (SPS), and the at least one processor is further configured to:
transmit a message, by the first network node to the second network node, at least one of confirming a previous modification or providing a new schedule based on the previous modification.

* * * * *